US010703487B2

(12) United States Patent
Parmentier et al.

(10) Patent No.: US 10,703,487 B2
(45) Date of Patent: Jul. 7, 2020

(54) SUPPLY OF AIR TO AN AIR-CONDITIONING CIRCUIT OF AN AIRCRAFT CABIN FROM ITS TURBOPROP ENGINE

(71) Applicants: SAFRAN AIRCRAFT ENGINES, Paris (FR); SAFRAN, Paris (FR); SAFRAN POWER UNITS, Toulouse (FR)

(72) Inventors: Nicolas Claude Parmentier, Moissy Cramayel (FR); Pierre Froment, Moissy Cramayel (FR); Jean-François Rideau, Tournefeuille (FR); Bruno Thoraval, Moissy Cramayel (FR)

(73) Assignees: SAFRAN AIRCRAFT ENGINES, Paris (FR); SAFRAN, Paris (FR); SAFRAN POWER UNITS, Toulouse (FR)

( * ) Notice: Subject to any disclaimer, the term of this patent is extended or adjusted under 35 U.S.C. 154(b) by 507 days.

(21) Appl. No.: 15/115,116

(22) PCT Filed: Jan. 29, 2015

(86) PCT No.: PCT/FR2015/050215
§ 371 (c)(1),
(2) Date: Jul. 28, 2016

(87) PCT Pub. No.: WO2015/114267
PCT Pub. Date: Aug. 6, 2015

(65) Prior Publication Data
US 2017/0008633 A1    Jan. 12, 2017

(30) Foreign Application Priority Data
Jan. 31, 2014    (FR) ..................... 14 00264

(51) Int. Cl.
*B64D 13/06*    (2006.01)
*F02C 6/20*    (2006.01)
(Continued)

(52) U.S. Cl.
CPC ............. *B64D 13/06* (2013.01); *B64D 13/00* (2013.01); *B64D 13/02* (2013.01); *B64D 13/08* (2013.01);
(Continued)

(58) Field of Classification Search
CPC ... F02C 9/18; F02C 6/08; B64D 13/02; B64D 13/04; B64D 13/06; B64D 2033/0293; Y02T 50/56; Y02T 50/671; Y02T 50/675
See application file for complete search history.

(56) References Cited

U.S. PATENT DOCUMENTS 4,503,666 A    3/1985   Christoff
5,114,103 A    5/1992   Coffinberry
(Continued)

FOREIGN PATENT DOCUMENTS

FR    1 208 140 A    2/1960
GB    2 247 510 A    3/1992

OTHER PUBLICATIONS

International Search Report dated May 29, 2015, issued in corresponding International Application No. PCT/FR2015/050215, filed Jan. 29, 2015, 5 pages.
(Continued)

*Primary Examiner* — Craig Kim
(74) *Attorney, Agent, or Firm* — Christensen O'Connor Johnson Kindness PLLC

(57) ABSTRACT

An aircraft turboprop engine includes at least a low-pressure body and a high-pressure body. The low-pressure body drives a propeller by means of a gearbox. The turboprop engine also includes means for supplying air to an air-
(Continued)

conditioning circuit of an aircraft cabin, wherein the supply means has at least one compressor borne by the gearbox and of which the rotor is coupled to the low-pressure body by means of the gearbox.

11 Claims, 3 Drawing Sheets

(51) Int. Cl.
| | |
|---|---|
| *B64D 13/00* | (2006.01) |
| *B64D 13/02* | (2006.01) |
| *B64D 13/08* | (2006.01) |
| *B64D 27/10* | (2006.01) |
| *F04D 29/32* | (2006.01) |
| *F04D 29/52* | (2006.01) |
| *F04D 29/56* | (2006.01) |
| *F04D 29/58* | (2006.01) |
| *F02C 7/27* | (2006.01) |
| *F02C 9/18* | (2006.01) |

(52) U.S. Cl.
CPC .............. *B64D 27/10* (2013.01); *F02C 6/206* (2013.01); *F02C 7/27* (2013.01); *F02C 9/18* (2013.01); *F04D 29/321* (2013.01); *F04D 29/522* (2013.01); *F04D 29/563* (2013.01); *F04D 29/5833* (2013.01); *B64D 2013/0618* (2013.01); *B64D 2013/0696* (2013.01); *F05B 2220/303* (2013.01); *F05B 2260/20* (2013.01); *F05D 2220/323* (2013.01); *F05D 2220/324* (2013.01); *F05D 2220/325* (2013.01); *F05D 2240/60* (2013.01); *F05D 2260/4031* (2013.01); *Y02T 50/56* (2013.01); *Y02T 50/671* (2013.01); *Y02T 50/675* (2013.01)

(56) References Cited

U.S. PATENT DOCUMENTS

| | | | |
|---|---|---|---|
| 2013/0000314 A1* | 1/2013 | McCaffrey | ............ F01D 13/003 60/773 |
| 2013/0040545 A1* | 2/2013 | Finney | .................. B64D 13/06 454/71 |
| 2016/0178464 A1* | 6/2016 | Burns | ....................... F02C 3/10 73/112.01 |

OTHER PUBLICATIONS

Written Opinion issued in corresponding International Application No. PCT/FR2015/050215, filed Jan. 29, 2015, 5 pages.

Written Opinion of the International Searching Authority dated May 29, 2015, issued in corresponding International Application No. PCT/FR2015/050215, filed Jan. 29, 2015, 6 pages.

International Preliminary Report on Patentability dated Aug. 2, 2016, issued in corresponding International Application No. PCT/FR2015/050215, filed Jan. 29, 2015, 1 page.

* cited by examiner

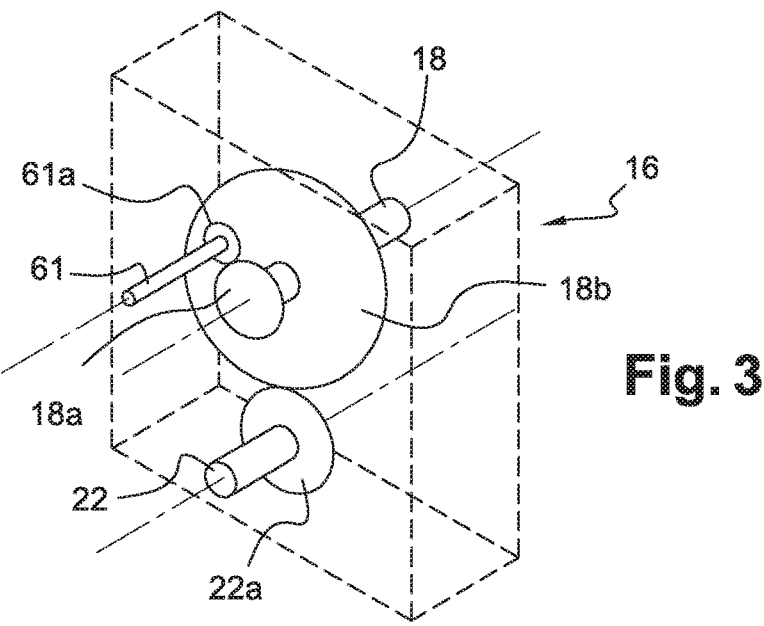
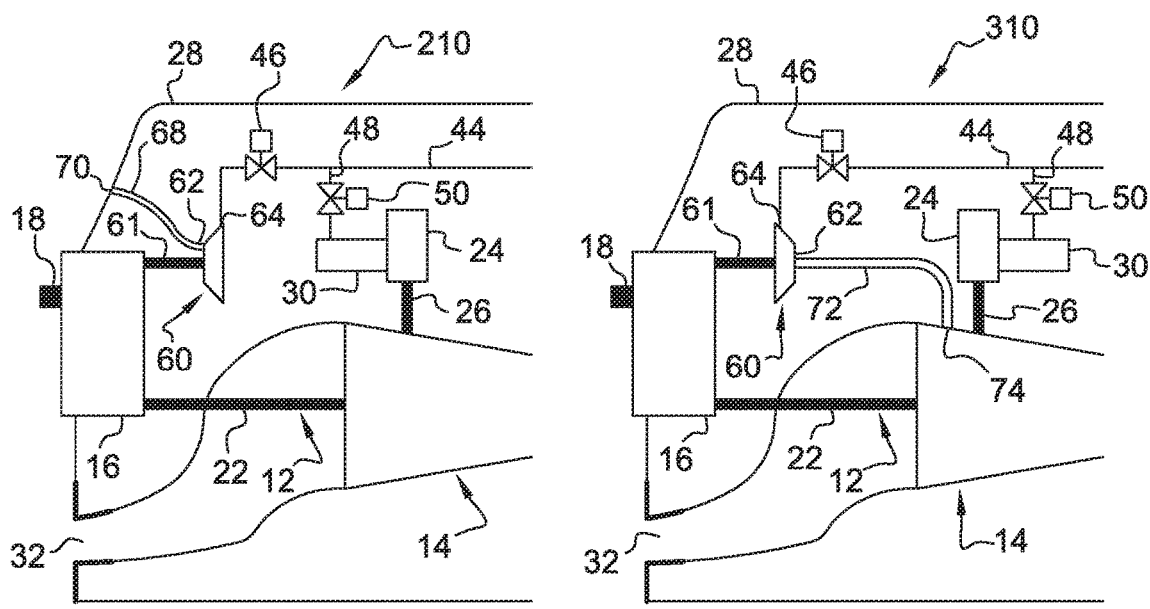
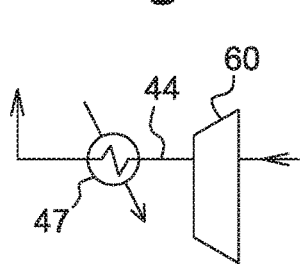 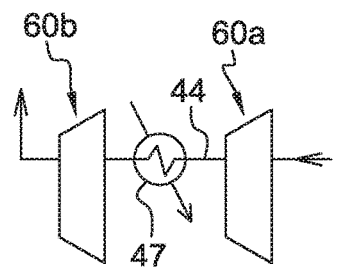 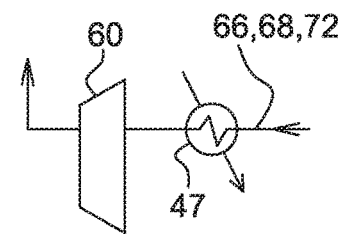

SUPPLY OF AIR TO AN AIR-CONDITIONING CIRCUIT OF AN AIRCRAFT CABIN FROM ITS TURBOPROP ENGINE

TECHNICAL FIELD

The present invention relates to the supply of air to an air-conditioning circuit of an aircraft cabin that is equipped with at least one turboprop engine.

PRIOR ART

On board an aircraft, it is necessary to have air available in order to be able to perform certain functions, such as the air conditioning of the cockpit and the passenger cabin or the de-icing of certain components of the aircraft. At high altitudes, the oxygen becomes scarcer and the air pressure drops. This involves pressurising the aircraft cabins in order to ensure the comfort and survival of the passengers during a flight. For this purpose, air with a minimum pressure level (in general between 0.8 and 1 bar) and a controlled temperature (regulatory requirement) must be supplied to the air-conditioning circuit. An aircraft is thus equipped with an air-conditioning circuit that is supplied by the engine or engines of the aircraft, which are turboprop engines in the context of the invention.

Typically, a turboprop engine comprises at least one low-pressure body and one high-pressure body, the low-pressure body driving a propulsion propeller by means of a gearbox or reduction gearbox, normally referred to as a PGB (standing for power gearbox). The low-pressure body comprises a turbine rotor connected by a shaft to the propeller and optionally to a compressor. Each other body comprises a compressor rotor connected by a shaft to a turbine rotor.

In the prior art, the air-conditioning circuit is supplied by air taken from one of the compressors of the turboprop engine. This does however present drawbacks, the most significant of which are:

the pressure of the air supplied to the aircraft greatly exceeds requirements, in particular during the climbing phase of the aircraft, which requires protection devices in case of overpressure and requires the air pipes to be dimensioned accordingly, the temperature of the air taken off, at the compressor, greatly exceeds the regulatory constraint (maximum temperature on passing through the fuel zones), which requires a cooling device that is difficult to integrate in the nacelle (generally referred to as a precooler) before the air is sent to the aircraft circuit, a large amount of energy is lost, which is detrimental to the consumption and efficiency of the turboprop engine, the pressure in the compressor drops on idling, which requires either the idling level of the turboprop engine to be increased in order to have sufficient pressure in the circuit, or air to be taken off at two points on the compressor, which requires two take-off ports and the same number of valves for switching the taking of air from one point to another, which is relatively complex. In both cases this gives rise to overconsumption of fuel on idling.

Solutions to this problem have already been proposed. It has in particular been proposed to supply an air-conditioning circuit with air taken from an auxiliary heat engine of the APU (auxiliary power unit) type installed in the aircraft. However, the operation of this engine is optimised on the ground and is therefore not efficient at altitude. The use thereof, except when there is an engine malfunction, involves additional consumption of fuel compared with the previous technique. Moreover, not all aircrafts are equipped with an engine of the APU type.

It has also been proposed to equip the aircraft with a dedicated compressor (dedicated to the supply of air to the cabin) driven by an electric motor. However, this solution is not satisfactory since it gives rise to a significant increase in mass, in particular because of the addition of the electric motor and a larger electricity generator for supplying this motor.

One solution to this problem could involve driving the dedicated compressor by the gearbox driving the accessory equipment of the engine, generally referred to as an accessory gearbox or AGB. This accessory gearbox is coupled to the high-pressure body of the turbine engine. However, this solution would not be satisfactory either since the speed of rotation of the high-pressure body varies to such an extent according to the operating conditions that the speed of rotation of the rotor of the dedicated compressor would be too low at idle speed for this compressor to be capable of providing an airflow at the minimum pressure required for the air-conditioning circuit.

Another solution to this problem involves driving the compressor by means of a power takeoff on the propulsion-propeller reduction gearbox, as described in the document FR 1 208 140 A. However, this solution has the same drawbacks as the previous solution since the speed of rotation of the body to which the propeller is coupled varies excessively according to the operating conditions. In addition, the temperature of the air supplied to the cabin depends on the compression to which it is subjected and is therefore likely to be too high for high speeds of rotation of the compressor since the speed of rotation of the compressor is not controlled. It is therefore important to be able to lower this temperature.

The present invention proposes a simple, effective and economical solution to at least some of the problems of the prior art.

DISCLOSURE OF THE INVENTION

The invention proposes an aircraft turboprop engine comprising at least one low-pressure body and one high-pressure body, the low-pressure body driving a propulsion propeller by means of a gearbox, preferably a single gearbox, the turboprop engine further comprising means for supplying air to an air-conditioning circuit of an aircraft cabin, characterised in that said supply means comprise at least one compressor carried by said gearbox, and the rotor of which is coupled to the low-pressure body by means of said gearbox.

The so-called load compressor is thus disposed as close as possible to the gearbox. The rotor of the load compressor and the gearbox are interconnected by a gear train. Preferably, this gear train will solely accelerate the movement in order to mechanically supply the rotor of the load compressor at a sufficient speed. This gear train comprises for example pinions meshing with one another, and advantageously has no radial shaft (which is radial with respect to the longitudinal axis of the turboprop engine).

The turboprop engine advantageously comprises a single gearbox for driving the propeller, which makes it possible in particular to simplify the turboprop engine and to limit the number of lubricating oil chambers.

The present invention thus proposes new technology for the supply of air to an air-conditioning circuit of an aircraft cabin. This air is supplied by a compressor, preferably dedicated to the supply of air to the cabin, rather than taken off from a compressor of the turboprop engine, which is less detrimental to performance. According to the invention, the rotor of this dedicated compressor is rotated by the low-pressure body, by means of the gearbox that connects the low-pressure body to the propulsion propeller. This is particularly advantageous, in particular when the turboprop engine is configured so that the speed of rotation of its low-pressure body obeys a discrete-speed law, that is to say each speed is constant in steps. The speed of the propeller may be within a fairly restricted range since it may no longer be functional if it slows down too much. The speed of rotation of the low-pressure body is in particular constant during the same flight phase. Flight phase means a phase during which the aircraft is performing only one type of manoeuvre. Thus the speed of rotation of the rotor of the dedicated compressor will not depend on the operating conditions, and the dedicated compressor will be able to provide airflow at the minimum pressure required for the air-conditioning circuit, even at idle speed. Moreover, it is no longer necessary to provide at least two air-takeoff ports on the compressor, as well as the associated valves, which is simpler.

The dedicated compressor may have one or a plurality of stages, each of any type, for example an axial or centrifugal stage.

According to another feature of the invention, the compressor comprises an air inlet connected to air-takeoff means in an air inlet sleeve of the turboprop engine. In a variant, the compressor comprises an air inlet connected to means for taking off air in a compressor of the turboprop engine. In a variant, the compressor comprises an air inlet connected to air-takeoff means between an air inlet sleeve and a compressor of the turboprop engine.

In a variant, the compressor comprises an air inlet connected to means for taking off air outside the turboprop engine.

A heat exchanger, for example of the precooler type, can be installed either between the air inlet of the dedicated compressor and the takeoff means, or between two compressors or two compressor stages (if it has at least two thereof), said two compressors or two compressor stages making up the compressor that is dedicated in particular to the supply of air to the cabin. The advantage of placing a heat exchanger in this way is that it is more effective than at the outlet of the dedicated compressor (for the same quantity of heat discharged by the exchanger, the reduction in temperature of the air sent to the aircraft is greater). This makes it possible for example to use a smaller heat exchanger than in the prior art.

The compressor may comprise an air outlet connected to a pipe intended to be connected to said circuit. This pipe may be equipped with at least one flow regulation system, for example a valve. It may be equipped with a heat exchanger, for example of the precooler type. This precooler can be simplified and can be more compact than in the prior art because the air supplying the dedicated compressor may have a relatively low temperature compared with the prior art. It can moreover be envisaged that the pressure of the air emerging from the dedicated compressor is close to the air pressure in the conditioning circuit, and therefore relatively low, which makes it possible to simplify the pipe and in particular to use a pipe with a thin wall in order to obtain a saving in mass compared with the prior art.

Advantageously, the turboprop engine may comprise a pneumatic starter, an air inlet of which is connected to said pipe. In the starting phase, the rotor of the pneumatic starter is coupled to the high-pressure body by an accessory gearbox and supplied with air by the aircraft via said pipe. Valves exclusively supply air to the starter. The present invention also makes it possible to supply the pneumatic starter via the pipes of the air-conditioning circuit.

The present invention also relates to a method for supplying air to an air-conditioning circuit of a cabin of an aircraft that is equipped with at least one turboprop engine comprising at least one low-pressure body and one high-pressure body, the low-pressure body driving a propulsion propeller by means of a single gearbox, characterised in that the circuit is supplied with air by at least one dedicated compressor which is carried by said gearbox and the rotor of which is coupled to the low-pressure body by means of said gearbox. This coupling can be achieved by means of the first gearbox or a second gearbox.

DESCRIPTION OF THE FIGURES

The invention will be better understood and other details, features and advantages of the invention will emerge from reading the following description given by way of non-limiting example and with reference to the accompanying drawings, in which:

FIG. 3 is a highly schematic view of a gearbox for driving the dedicated compressor of the air-supply means according to the invention, FIG. 4 and FIG. 5 are views similar to that of FIG. 2 and show variants of the air-takeoff means of the invention, FIGS. 6a, 6b and 6c are highly schematic views of variants of the air supply means of the aircraft according to the invention.

DETAILED DESCRIPTION

Figure 1:
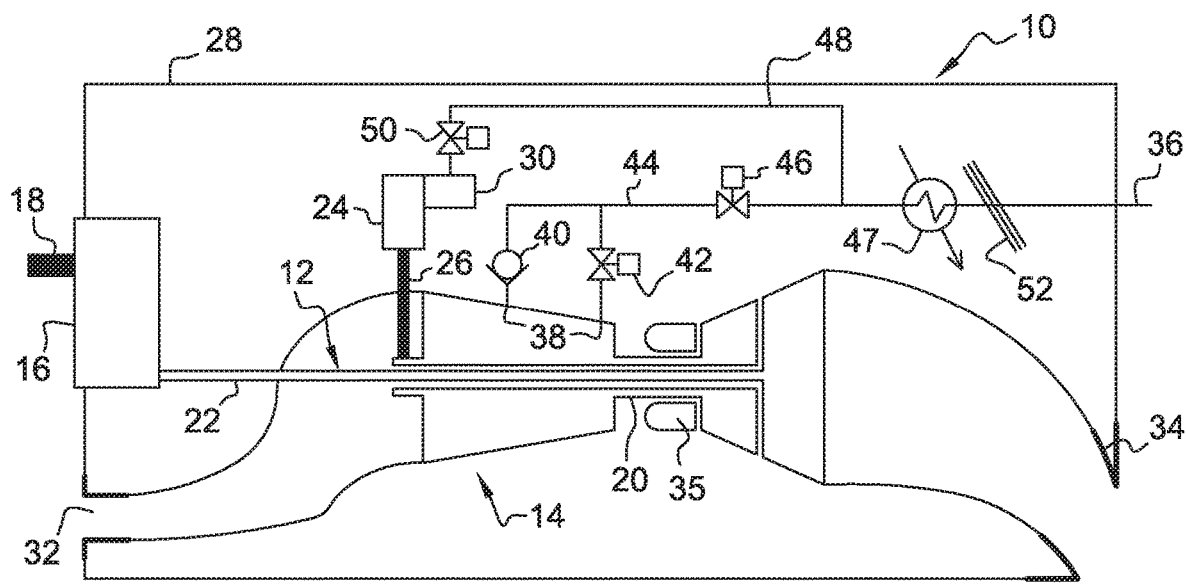
FIG. 1 is a highly schematic view of an aircraft turboprop engine and depicts means for supplying air to an air-conditioning circuit of a cabin of the aircraft, according to the prior art.

Reference is made first of all to FIG. 1, which depicts a turboprop engine 10 according to the prior art, for an aircraft.

In this case, the turboprop engine 10 is of the double-body type and comprises a low-pressure body 12 and a high-pressure body 14, the low-pressure body 12 driving a propulsion propeller by means of a gearbox 16 or reduction gearbox, usually referred as a PGB (power gearbox). Only the shaft 18 of the propulsion propeller is shown in FIG. 1.

In this case, the low-pressure body 12 comprises only a turbine rotor connected by a shaft to the gearbox 16. The high-pressure body 14 comprises a compressor rotor connected by a shaft to a turbine rotor. The shaft of the high-pressure body 14, referred to as HP shaft 20, is tubular and has the shaft of the low-pressure body 12, referred to as the LP or power shaft 22, passing coaxially therethrough. The LP shaft 22 comprises at one end a pinion (not shown) coupled by means of a series of pinions of the gearbox 16 to the shaft 18 of the propulsion propeller.

The turboprop engine 10 comprises a box 24 for driving accessory equipment (referred to as the accessory box or AGB, standing for accessory gearbox) that is coupled to the high-pressure body of the turbine engine 14, and in particular to the HP shaft, by means of a radial shaft 26. The accessory gearbox 24 is mounted in the nacelle 28 of the turboprop engine 10, which is depicted schematically by a rectangle in dotted lines.

The accessory gearbox 24 carries and drives a plurality of items of equipment, including a pneumatic starter 30 which, as its name indicates, is intended to start the turboprop engine 10 by rotating its high-pressure body, by means of the accessory gearbox 24 and the radial shaft 26.

The turboprop engine 10 further comprises an air inlet 32 for supplying air to the engine, and a combustion-gas exhaust pipe 34. The turboprop engine 10 further comprises a combustion chamber 35, between the LP and HP compressors on the one hand and the HP and LP turbines on the other hand.

The turboprop engine 10 is further equipped with means for supplying air to an air-conditioning circuit 36 of a cabin of the aircraft, these means comprising, according to the prior art, means for taking air from the turboprop engine 10. The turboprop engine 10 is equipped with two ports 38 or orifices for taking off compressed air, each of these ports 38 being connected by a valve 40, 42 to a pipe 44 supplying air to the circuit 36.

The first port 38 or upstream port (with reference to the direction of flow of the gases in the engine) makes it possible to take off air at an intermediate pressure. The valve 40 connected to this pipe 44 is of the non-return valve type.

The second port 38 or downstream port makes it possible to take off air at high pressure. The valve 42 connected to this pipe 44 is opened when the pressure of the air taken off by the valve 40 is not sufficient, the air taken off by the valve 40 being prevented from being reinjected upstream by the non-return function of the shutter of the valve 40.

The pipe 44 is equipped with a valve 46 that regulates the supply pressure of the circuit 36, and a heat exchanger 47 of the precooler type, which is intended to lower the temperature of the air before it is introduced into the circuit 36. The pipe 44 is further connected to an air inlet of the pneumatic starter 30 by a conduit 48 equipped with a valve 50. The pipe 44 passes through a fire-resistant partition 52 before being connected to the circuit 36.

The technology depicted in FIG. 1 has numerous drawbacks described above.

The present invention makes it possible to overcome these drawbacks by equipping the turboprop engine with a dedicated compressor, referred to as a load compressor, the rotor of which is coupled to the low-pressure body of the engine by means of the gearbox.

Figure 2:
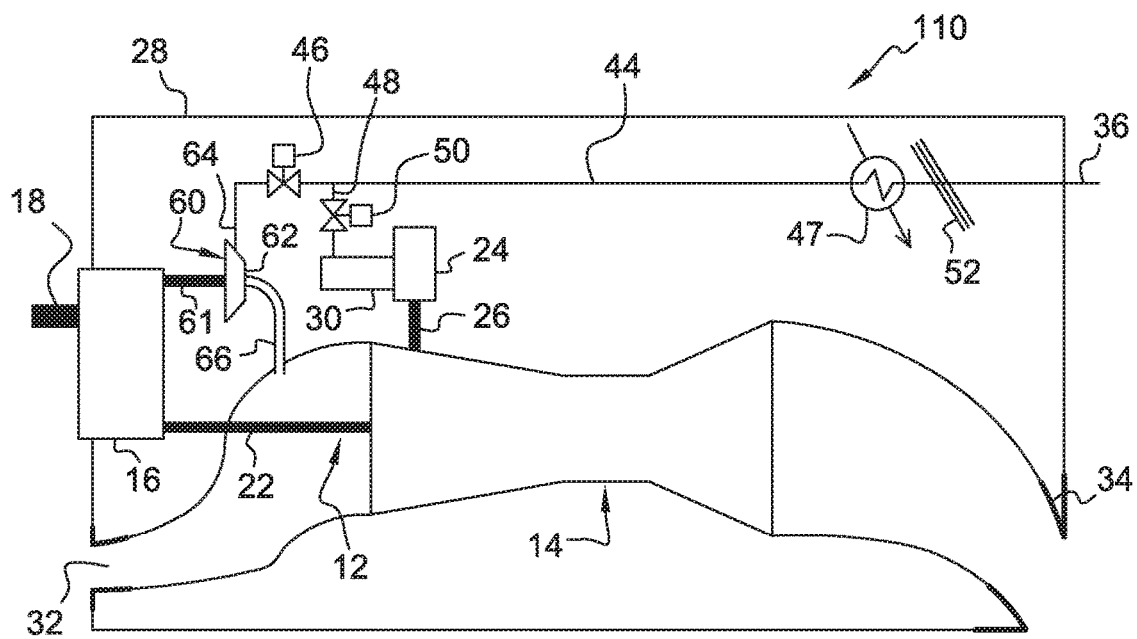
FIG. 2 is a highly schematic view of an aircraft turboprop engine and depicts means for supplying air to an air-conditioning circuit of a cabin of the aircraft, according to an embodiment of the invention.

FIGS. 2, 4, and 5 depict various embodiments of this invention in which the elements already described above are designated by the same reference numerals. The turboprop engines in FIGS. 2, 4 and 5 may be of the same type as that depicted in FIG. 1, or of a different type. They may for example comprise more than two bodies. Moreover, the low-pressure body of each turboprop engine according to the invention may comprise an LP compressor.

The turboprop engine 110 of FIG. 2 differs from that in FIG. 1 essentially by the means for supplying air to the circuit 36.

In this case, these supply means comprise a dedicated compressor 60, the rotor 61 of which is coupled by the gearbox 16 to the low-pressure body 12 and in particular to the LP shaft 22. As depicted schematically in FIG. 3, the rotor shaft 61 of the compressor 60 can carry a pinion 61a meshing with a pinion 18a of the shaft 18 of the propeller of the turboprop engine 110, this shaft 18 carrying another pinion 18b meshing with a pinion 22a of the LP shaft 22. The pinions 18a, 18b, 22a, 61a are housed in the gearbox 16.

The compressor 60 comprises an air inlet 62 and an air outlet 64. In the example depicted, the air inlet 62 is connected by a conduit 66 to the air inlet sleeve 32 of the turboprop engine 110, that is to say to the section of the turboprop engine 110 extending between the air inlet 32 and the inlet of the turbine engine 14. Relatively cool air is thus taken off by the conduit 66 to supply the compressor 60.

The air outlet 64 of the compressor 60 is connected to the pipe 44 supplying air to the circuit 36. As described previously, this pipe 44 comprises a valve 46 that regulates the supply pressure of the circuit 36, and a heat exchanger 47 of the precooler type, which is intended to reduce the temperature of the air before it is introduced into the circuit 36. The pipe 44 is further connected to an air inlet of the pneumatic starter 30 by a conduit 48 equipped with a valve 50.

The turboprop engine 210 of FIG. 4 differs from the one in FIG. 2 essentially in that the air inlet 62 of the compressor 60 is connected by a conduit 68 to an air-takeoff scoop 70 which is situated on the external wall of the nacelle 28 and is intended to take off air flowing around the turboprop engine 210 in operation.

The turboprop engine 310 in FIG. 4 differs from the one in FIG. 2 essentially in that the air inlet 62 of the compressor 60 is connected by a conduit 72 to a port 74 for taking off air from a compressor of the engine. Although air is taken off from the engine, the engine is equipped with a single take-off port compared with two in the prior art. Because of the compression of the air taken off from the compressor 60, the air taken off does not need to have a high pressure. Taking off air as far upstream as possible on the compressor can therefore be envisaged.

The compressor 60 used in the context of the invention (FIGS. 2, 4 and 5) may be of any type and is for example an axial compressor with one or more stages or a centrifugal compressor with one or more stages or a mixed compressor comprising one of more axial stages and one or more centrifugal stages.

It can also be envisaged to use more than one load compressor and for example two load compressors connected in series.

FIG. 6a to 6c depict variants of the invention relating in particular to the position of the heat exchanger 47. As can be seen in FIG. 6a, the heat exchanger 47 can be mounted downstream of the compressor 60, that is to say on the pipe 44, as is the case in FIG. 2. In FIG. 6b, the heat exchanger 47 is mounted between two compressors 60a, 60b. Each compressor may comprise one or more stages in order to cover the aforementioned two cases. Each stage may be an axial or centrifugal stage. In FIG. 6c, the exchanger 47 is mounted upstream of the compressor 60, that is to say on the conduit 66, 68, 72 described with reference to FIGS. 2, 4 and 5.

The supply of air to the circuit 36 can be achieved as follows, with any of the embodiments of the invention described above.

After the turboprop engine 110, 210, 310, is started up, the low-pressure body 12 and its shaft 22 in general rotate at a substantially constant speed. The rotor of the compressor 60 is rotated at a substantially constant speed, which depends in particular on the step-down coefficient of the gearbox 16. The rotation of the rotor shaft 61 of the compressor 60 causes the suction and take off of air by the conduit 66, 68, 72, as far as the air inlet 62 of the compressor 60. This air is then compressed by the compressor 60, which supplies compressed air to the pipe 44 at a predetermined pressure.

The valve 46 regulates the supply pressure of the circuit 36. The heat exchanger 47 makes it possible to reduce the temperature of the air before it is introduced into the circuit 36 (FIG. 6a), before it enters the compressor (FIG. 6c) or between two compression phases (FIG. 6b). Whatever the operating conditions of the turboprop engine 110, 210, 310, the rotor shaft 61 of the compressor 60 rotates at a constant speed in the case where the speed of rotation of the low-pressure body 12 is also constant.

A load compressor rotates typically at 60,000 rpm and the LP shaft that drives it at approximately 15,000 rpm. It is therefore necessary to multiply the drive speed by four. Integrating the load compressor in the gearbox makes it possible to directly multiply by a ratio of four (and to not use the radial shaft, as depicted in FIG. 3). In this way the number of gears is limited. In addition, it is no longer necessary to have a dedicated lubrication system for the gearbox. There will only be multiplying ratios between the LP shaft and the shaft of the load compressor.

Figures 7A, 7B:
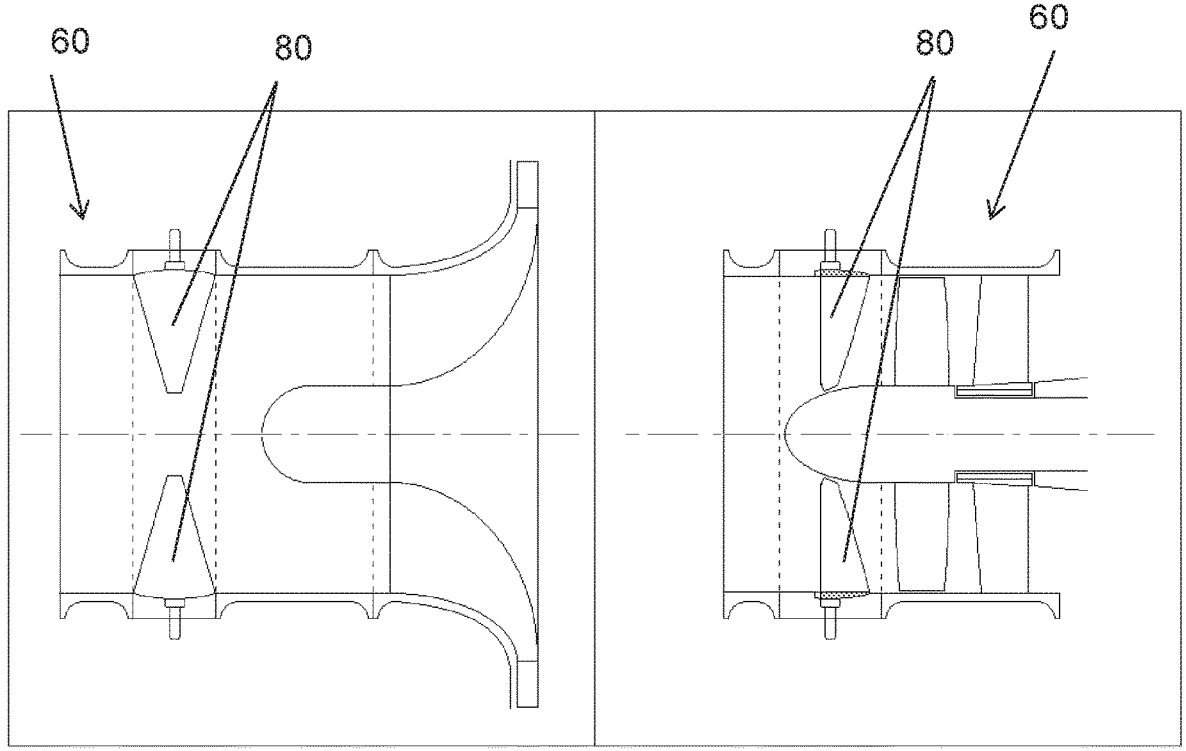
FIGS. 7a and 7b are schematic views in axial section of centrifugal and axial load compressors, respectively.

A casing common to the gearbox 16 and to the compressor 60 will also allow a saving in mass (less wall) and the absence of lubrication dedicated to additional gearboxes. Moreover, as depicted in FIGS. 7a and 7b, it is possible to introduce variable geometries (movable guide vanes 80) on the air inlet of the load compressor 60 in order to modulate its operation, the load compressor 60 being a centrifugal (FIG. 7a) or axial (FIG. 7b) compressor. Thus it is possible to dispense with a clutch system or modulation valve.

The invention claimed is:

1. An aircraft turboprop engine comprising at least one low-pressure body comprising one turbine rotor and one high-pressure body comprising a compressor rotor and a turbine rotor connected to each other by a shaft, the low-pressure body further comprising a shaft connecting the turbine rotor to a gearbox driving a propulsion propeller, said gearbox being a single gearbox, the turboprop engine further comprising means, an air inlet of which is supplied with air by a conduit and an outlet of which is connected to a pipe that supplies air to an air-conditioning circuit of an aircraft cabin, wherein said means comprise at least one air compressor comprising the air inlet and the air outlet, said at least one air compressor being carried by said gearbox, and a rotor of said at least one compressor being mechanically coupled in said gearbox to a shaft of the propulsion propeller driven by the low-pressure body.

2. The turboprop engine according to claim 1, wherein the air inlet of the at least one air compressor is connected to an air inlet sleeve of the turboprop engine for taking off air from the turboprop engine.

3. The turboprop engine according to claim 1, wherein the air inlet of the at least one air compressor is connected to a compressor of the turboprop engine for taking off air from the turboprop engine.

4. The turboprop engine according to claim 1, wherein the air inlet of the at least one air compressor is connected to the outside of the turboprop engine for taking off air outside the turboprop engine.

5. The turboprop engine according to claim 2, wherein a heat exchanger is either mounted between the air inlet of the at least one air compressor and the means for taking off air or between two compressors or between two compressor stages.

6. The turboprop engine according to claim 1, wherein the pipe connected to said air-conditioning circuit is equipped with at least one regulation means such as a valve.

7. The turboprop engine according to claim 6, wherein said turboprop engine comprises a pneumatic starter, an air inlet of which is connected to said pipe.

8. The turboprop engine according to claim 6, wherein the pipe is equipped with a heat exchanger.

9. The turboprop engine according to claim 1, wherein the engine is configured so that the speed of rotation of the low-pressure body is substantially constant whatever the operating conditions.

10. The turboprop engine according to claim 1, wherein the rotor of said at least one air compressor is connected to the gearbox by a gear train comprising pinions, and preferably without a radial shaft.

11. A method for supplying air to an air-conditioning circuit of a cabin of an aircraft that is equipped with at least one turboprop engine comprising at least one low-pressure body comprising one turbine rotor and one high-pressure body comprising a compressor rotor and a turbine rotor connected to each other by a shaft, the low pressure body comprising a shaft connecting the turbine rotor to a gearbox driving a propulsion propeller, wherein the air-conditioning circuit is supplied with air by at least one dedicated air compressor, said at least one dedicated air compressor being carried by said gearbox and the rotor of said at least one dedicated air compressor being coupled to the low-pressure body by means of said gearbox.

* * * * *